United States Patent [19]

Woodhead

[11] 4,181,532

[45] Jan. 1, 1980

[54] PRODUCTION OF COLLOIDAL DISPERSIONS

[75] Inventor: James L. Woodhead, Didcot, England

[73] Assignee: United Kingdom Atomic Energy Authority, London, England

[21] Appl. No.: 917,484

[22] Filed: Jun. 21, 1978

Related U.S. Application Data

[63] Continuation of Ser. No. 733,153, Oct. 18, 1976, abandoned.

[30] Foreign Application Priority Data

Oct. 22, 1975 [GB] United Kingdom ............... 43436/75

[51] Int. Cl.$^2$ ...................... C04B 21/00; C04B 35/44; B01J 13/00
[52] U.S. Cl. ................................. 106/40 R; 106/73.2; 106/73.4; 252/313 R; 252/317; 423/592
[58] Field of Search ...................... 106/40 R, 39.5, 62, 106/65, 73.2, 73.4; 252/313 R, 317; 423/592

[56] References Cited

U.S. PATENT DOCUMENTS

| | | | |
|---|---|---|---|
| 3,110,681 | 11/1963 | Meadows et al. | 252/313 R |
| 3,645,910 | 2/1972 | Woodhead | 252/317 |
| 3,691,089 | 9/1972 | Janzon | 252/317 |
| 3,725,094 | 4/1973 | Levy et al. | 106/73.4 |
| 3,954,945 | 5/1976 | Lange et al. | 423/592 |

FOREIGN PATENT DOCUMENTS 1174648 12/1969 United Kingdom ............... 252/313 R Primary Examiner—O. R. Vertiz
Assistant Examiner—Mark Bell
Attorney, Agent, or Firm—Larson, Taylor and Hinds

[57] ABSTRACT

A colloidal dispersion is disclosed in which colloidal particles of an inorganic substance, and a compound of a Group IIA, or of a Group IIIA, or of a lanthanide (rare earth) element are dispersed throughout a liquid. The colloidal dispersion can be dried to form gels and the gels calcined to form porous ceramic materials.

7 Claims, No Drawings

PRODUCTION OF COLLOIDAL DISPERSIONS

This is a continuation of application Ser. No. 733,153 filed Oct. 18, 1976, now abandoned.

The present invention relates to the production of colloidal dispersions.

According to one aspect of the present invention there is provided a colloidal dispersion comprising, dispersed in a liquid medium, a compound of a Group IIA, or of a Group IIIA, or of a lanthanide (rare earth) element, and colloidal particles of an inorganic substance, wherein the compound is soluble in the liquid medium and the colloidal particles are dispersed in the liquid medium in the form of a sol thereof.

According to another aspect of the present invention there is provided a process for the production of a colloidal dispersion which comprises providing, in a liquid medium, colloidal particles of an inorganic substance dispersed therein to constitute a sol and a compound of a Group IIA, or of a Group IIIA, or of a lanthanide (rare earth) element dissolved therein.

We believe, but are by no means certain, that the colloidal paticles of the inorganic substance "take up" ions (e.g. anions) from the compound in solution (i.e. act as an ion a "getter") thereby to enable the Group IIA Group IIIA or lanthanide element to be incorporated in a colloidal form so that the colloidal dispersion comprises a mixed sol.

Of the Group IIA elements we prefer to use magnesium or beryllium.

In carrying out the method of the present invention to produce the colloidal dispersion a sol of the inorganic substance and a solution of the compound in the liquid medium can be mixed together.

Alternatively, the colloidal particles of the inorganic substance can be added to a solution of the compound in the liquid medium. In a further alternative the compound can be added to a sol comprising colloidal particles of the inorganic substance dispersed in the liquid medium.

In the production of certain chemical products, such as catalysts and catalytic materials (e.g. as described in our co-pending U.K. Application of even date, No. 43435/75 a useful starting material can be a colloidal dispersion containing a refractory oxide and a grain growth inhibitor to inhibit grain growth in refractory oxide formed from the dispersion.

Generaly the colloidal dispersion does not contain a grain growth inhibitor as such, but a precursor therefor (e.g. a substance capable of producing grain growth inhibitor on heating). Thus, the term "grain growth inhibitor" as used in this specification embraces both a grain growth inhibitor and a precursor therefor.

Colloidal dispersions suitable for use as starting materials as hereinbefore mentioned can be prepared by mixing sols of refractory oxide and of grain growth inhibitor. However, it can be difficult and/or expensive to obtain both oxide and grain growth inhibitor in the form of sols which are suitable for mixing together to give a stable mixed colloidal dispersion.

The present invention provides a process which may be used to avoid the necessity of obtaining both oxide and grain growth inhibitor separately in the required sol form prior to mixing together.

Thus, in a preferred embodiment of the invention the colloidal particles of inorganic substance comprise colloidal particles of a refractory oxide and the compound is a grain growth inhibitor, so that the colloidal dispersion contains refractory oxide and grain growth inhibitor for the oxide.

The grain growth inhibitor may be a Group IIA, Group IIIA or a lanthanide (rare earth) element.

In the process of the present invention the compound is preferably a salt (e.g. a nitrate) and the solvent is preferably water.

Examples of refractory oxides which can be used in accordance with the preferred embodiment of the invention are lanthanide (rare earth) oxides (e.g. ceria), zirconia, magnesia beryllia, thoria, silica, alumina, titania, tungsten oxide and combinations thereof. In the preparation of starting materials suitable for the production of catalysts or of carriers for catalytic materials we prefer that the refractory oxide is an oxide of an element whose atomic number does not exceed 40.

Although some elements (e.g. lanthanides) may be used in accordance with the present invention either as the refractory oxide or as the grain growth inhibitor, in a given combination the refractory oxide and grain growth inhibitor should be different.

In one preferred example of the invention the colloidal particles comprise alumina and the compound is yttrium nitrate and we believe, but are by no means certain, that in this case the colloidal alumina particles in the colloidal dispersion "take up" nitrate ions (i.e. act as a nitrate "getter") thereby to enable the yttrium present to be incorporated into a colloidal form so that the colloidal dispersion comprises a mixed sol.

Colloidal dispersions containing alumina and yttrium have been prepared in accordance with the present invention by dispersing a fine small particle size, high surface area form of alumina produced by flame hydrolysis of a halide in water to form a sol (in accordance with the invention disclosed in our co-pending U.K. Application of even date No. 43463/75) and subsequently adding yttrium nitrate in aqueous solution.

Flame hydrolysis is a specific example of a vapour phase condensation method for preparing substances in a fine, small particle size, high surface area form suitable for dispersing in a liquid medium to form a sol. Accordingly it is to be understood that substances produced by other vapour phase condensation methods can be used in accordance with the present invention.

By "vapour phase condensation method" we mean a method which makes a vapour phase intermediate. Examples of vapour phase condensation methods are hydrolysis of volatile halides or alkoxides (e.g. flame hydrolysis of volatile metal halides), evaporation and condensation methods using electronbeam, D.C. arc or RF plasma heating, and metal oxidation (e.g. of Mg) to give a smoke which is then condensed.

Colloidal dispersions of alumina containing up to 5 wt% yttria (equivalent) have been prepared in accordance with the invention. Higher concentration of yttria can be incorporated if required.

Gels containing alumina and yttria have been prepared by drying the colloidal dispersions.

Thus, according to a further aspect of the present invention there is provided a process for the production of a mixed gel which comprises providing in a liquid medium colloidal particles of an inorganic substance dispersed therein to constitute a sol and a compound of a Group IIA, or of a Group IIIA, or of a lanthanide (rare earth) element dissolved therein, thereby to give a colloidal dispersion, and drying said colloidal dispersion to form a gel.

Drying may be effected by one or more of a number of methods (e.g. spray drying or tray drying).

According to yet a further aspect of the present invention there is provided a process for the production of a porous ceramic material comprising providing in a liquid medium colloidal particles of an inorganic substance dispersed therein to constitute a sol and a compound of a Group IIA, or of a Group IIIA, or of a lanthanide (rare earth) element dissolved therein, thereby to give a colloidal dispersion, drying said colloidal dispersion to form a gel and heating said gel to form a porous ceramic material.

Gel particles or particles of porous ceramic material can be produced in accordance with the present invention, for example by forming the colloidal dispersion into droplets prior to drying thereby to give substantially spherical particles.

According to yet a further aspect, the invention provides a colloidal dispersion prepared by a process in accordance with the present invention.

The invention also provides a mixed gel or porous material prepared by a process in accordance with the present invention.

The invention further provides a gel obtainable by drying a colloidal dispersion in accordance with the present invention. Also the invention provides a porous ceramic material obtainable by drying a colloidal dispersion in accordance with the present invention to form a gel and subsequently heating the gel.

The invention will now be particularly described, by way of example, as follows:

EXAMPLE 1

Finely powdered alumina having a small particle size (about 0.01 μm) and high surface area (~100 m²/g) was dispersed in water to give a sol containing 160 g/l aluminum oxide ($Al_2O_3$). Yttrium nitrate was dissolved in water to form a solution containing 170 g/l yttria ($Y_2O_3$) equivalent.

The above sol and the above solution were mixed in proportions to give a colloidal dispersion (which may be referred to as a "mixed sol") having the composition: $Al_2O_3$: 91.5 g/l; $Y_2O_3$ equivalent: 0.46 g/l; $NO_3$: 0.75 g/l; mol ratio $NO_3^-/Al+Y$: 0.006 (i.e. 0.5 wt% $Y_2O_3$/$Al_2O_3$). The colloidal dispersion ("mixed sol") was observed to be stable.

EXAMPLE 2

The procedure of Example 1 was repeated but the proportions were adjusted to prepare a colloidal dispersion having 0.1 wt% $Y_2O_3/Al_2O_3$.

EXAMPLE 3

The procedure of Example 1 was repeated but the proportions were adjusted to prepare a colloidal dispersion having 1 wt% $Y_2O_3/Al_2O_3$.

EXAMPLE 4

The procedure of Example 1 was repeated but the proportions were adjusted to prepare a colloidal dispersion having 5 wt% $Y_2O_3/Al_2O_3$.

EXAMPLE 5

Samples of alumina gels containing 0.2% w/w $Y_2O_3$. were prepared from sols similar to those prepared in Examples 1 to 4 and their surface and porous properties measured.

The properties were also measured after calcining for 2 hours in air at various temperatures.

The results are summarised in the following table:

| Calcination Temp (°C.) | Specific surface area ($S_{BET}/m^2g^{-1}$) | Total pore value ($V_p/dm^3Kg^{-1}$) |
| --- | --- | --- |
| 1100 | 72 | 0.56 |
| 1150 | 10 | |
| 1200 | <<10 | |

EXAMPLE 6

This example relates to the preparation of a 0.2 wt% yttrium oxide-alumium oxide gel.

300 g of alumina powder were added to 1.2 l of 0.03 M nitric acid and stirred for 2 hours. When the alumina powder had been dispersed 2.4 ml of a yttrium nitrate solution containing the equivalent of 250 g/l of $Y_2O_3$ were added.

The colloidal dispersion thereby formed was evaporated at 25° C. over a period of 5 days to yield a gel containing 93.7 wt% oxide.

EXAMPLE 7

The gel produced in Example 6 was calcined at 700° C. to give a porous ceramic material. After this calcination photomicrography showed that 3 mm fragments of oxide had shrunk by less than 2% from the original gel.

I claim:

1. A colloidal dispersion comprising dispersed in water, a compound selected from the group consisting of yttrium and lanthanide (rare earth) element compounds and colloidal particles of alumina produced by vapor phase condensation.

2. A colloidal dispersion as claimed in claim 1 wherein the compound is a water soluble salt of yttrium.

3. A process for the production of a colloidal dispersion which comprises providing in water colloidal particles of alumina produced by vapor phase condensation dispersed therein to constitute a sol and a compound selected from the group consisting of yttrium and lanthanide (rare earth) element compounds dissolved therein.

4. A process as claimed in claim 3 wherein the colloidal particles have been produced by flame hydrolysis of a halide.

5. A process for the production of a mixed gel comprising providing in water colloidal particles of alumina produced by vapor phase condensation dispersed therein to constitute a sol and a compound selected from the group consisting of yttrium and lanthanide (rare earth) element compounds dissolved therein, thereby to give a colloidal dispersion, and drying said colloidal dispersion to form a gel.

6. A process as claimed in claim 5 wherein the colloidal dispersion is dryed by spray drying.

7. A process for the production of a porous ceramic material comprising providing in water, colloidal particles of alumina produced by vapor phase condensation dispersed therein to constitute a sol and a compound selected from the group consisting of yttrium and lanthanide (rare earth) element compounds dissolved therein, thereby to give a colloidal dispersion to form a gel and heating said gel to form a porous ceramic material.

* * * * *